US012794224B2

(12) United States Patent
Rothmund et al.

(10) Patent No.: US 12,794,224 B2
(45) Date of Patent: Nov. 10, 2026

(54) DC DISTRIBUTION SYSTEM AND METHOD FOR DISTRIBUTING POWER

(71) Applicant: ABB E-mobility B.V., Delft (NL)

(72) Inventors: Daniel Rothmund, Mülligen (CH); Francisco Canales, Baden-Dättwil (CH)

(73) Assignee: ABB E-MOBILITY B.V., Delft (NL)

( * ) Notice: Subject to any disclaimer, the term of this patent is extended or adjusted under 35 U.S.C. 154(b) by 747 days.

(21) Appl. No.: 18/309,956

(22) Filed: May 1, 2023

(65) Prior Publication Data

US 2023/0361561 A1 Nov. 9, 2023

(30) Foreign Application Priority Data

May 4, 2022 (EP) .................................... 22171678

(51) Int. Cl.
*H02J 1/00* (2026.01)
*B60L 53/60* (2019.01)
(Continued)

(52) U.S. Cl.
CPC .............. *H02J 1/001* (2020.01); *B60L 53/60* (2019.02); *H02J 1/084* (2020.01); *H02J 1/102* (2013.01);
(Continued)

(58) Field of Classification Search
CPC .. H02J 1/001; H02J 1/084; H02J 1/102; H02J 7/02; H02J 7/50; H02J 2105/37;
(Continued)

(56) References Cited

U.S. PATENT DOCUMENTS 4,929,901 A * 5/1990 Kimball ................. G01R 31/52 324/528
8,013,570 B2 9/2011 Baxter et al.
(Continued)

FOREIGN PATENT DOCUMENTS

CN 104160546 A 11/2014
DE 202017105809 U1 1/2018
(Continued)

OTHER PUBLICATIONS

J.-D. Park, J. Candelaria, L. Ma and K. Dunn, "DC Ring-Bus Microgrid Fault Protection and Identification of Fault Location," in IEEE Transactions on Power Delivery, vol. 28, No. 4, pp. 2574-2584, Oct. 2013 (Year: 2013).*
(Continued)

*Primary Examiner* — M Baye Diao
(74) *Attorney, Agent, or Firm* — McCarter & English, LLP; Michael M. Gnibus

(57) ABSTRACT

A direct current (DC) distribution system includes a plurality of power consumer clusters, each comprising at least one power consumer. The power consumer clusters are arranged as a ring structure with a common low voltage (LV)-DC ring bus. Each power consumer is connected to the LV-DC ring bus. The DC distribution system further comprises a plurality of normal-open ring switches. Each power consumer cluster is separated from its adjacent power consumer clusters by one of the normal-open ring switches. Each power consumer cluster is fed by a MV-DC/DC converter, which in turn is fed by a MV-AC/DC converter connected to a MV-AC grid.

16 Claims, 4 Drawing Sheets

(51) Int. Cl.
*H02J 1/08* (2026.01)
*H02J 1/102* (2026.01)
*H02J 7/02* (2016.01)

(52) U.S. Cl.
CPC ............. *H02J 7/02* (2013.01); *B60L 2210/10* (2013.01); *B60L 2210/30* (2013.01)

(58) Field of Classification Search
CPC ..... H02J 1/086; H02J 1/10; H02J 1/14; B60L 53/60; B60L 2210/10; B60L 2210/30; B60L 53/11; B60L 53/53; B60L 53/67; B60L 55/00; B60L 53/00
USPC .......................................................... 320/109
See application file for complete search history.

(56) References Cited

U.S. PATENT DOCUMENTS 8,502,500 B2 8/2013 Baxter et al.
9,013,902 B2 * 4/2015 Abe .......................... H02J 3/00 363/69
9,201,407 B2 12/2015 Baxter et al.
9,201,408 B2 12/2015 Baxter et al.
9,469,211 B2 10/2016 Baxter et al.
9,660,439 B2 * 5/2017 Kolhatkar ................. H02J 1/10
9,908,421 B2 3/2018 Koolen et al.
9,908,427 B2 3/2018 Baxter et al.
9,991,701 B2 * 6/2018 Reddy ..................... H02J 1/102
10,252,633 B2 4/2019 Baxter et al.
10,272,791 B2 4/2019 Chen et al.
10,587,115 B2 3/2020 Lao et al.
10,696,183 B2 6/2020 Roggendorf et al.
10,744,883 B2 8/2020 Quattrini, Jr. et al.
10,797,592 B2 * 10/2020 Jacobson .................. H02J 1/04
10,807,485 B2 10/2020 Koolen et al.
10,913,372 B2 2/2021 Baxter et al.
11,073,807 B2 * 7/2021 Zimmanck ................ H02J 3/14
11,230,202 B2 * 1/2022 Qi ........................... B60L 53/22
11,787,522 B2 * 10/2023 Schulz ................... B63H 21/16 440/6
11,862,974 B2 * 1/2024 Matan ..................... H02J 3/003
12,418,191 B2 * 9/2025 Wu ......................... B60L 50/40
2014/0240880 A1 8/2014 Chen et al.
2014/0375265 A1 12/2014 Koyama et al.
2015/0165917 A1 6/2015 Robers et al.
2016/0164312 A1 6/2016 Ohta et al.
2017/0225575 A1 8/2017 Noro et al.
2017/0294782 A1 * 10/2017 Navarro .................... H02J 3/02
2018/0001780 A1 1/2018 Li et al.
2018/0290544 A1 * 10/2018 Long ....................... H02J 7/585
2021/0178918 A1 6/2021 Qi
2021/0403135 A1 * 12/2021 Schulz ................... B63H 21/16

FOREIGN PATENT DOCUMENTS

EP 3694072 A1 * 8/2020 ................ H02J 5/00
EP 3333005 B1 3/2021
WO WO-2014121826 A1 * 8/2014 ............. H02J 1/102
WO WO 2019/215130 A1 11/2019
WO WO 2020/173930 A1 9/2020
WO WO 2020/181384 A1 9/2020
WO WO 2020/225378 A1 11/2020
WO WO 2021/130158 A1 7/2021

OTHER PUBLICATIONS

P. Cairoli and R. A. Dougal, "Fault Detection and Isolation in Medium-Voltage DC Microgrids: Coordination Between Supply Power Converters and Bus Contactors," in IEEE Transactions on Power Electronics, vol. 33, No. 5, pp. 4535-4546, May 2018 (Year: 2018).*
Kumar et al., "Grounding Schemes, Power Quality, Communication Networks, Applications, and Standardizations Aspects," *IEEE Access*, 5(2017): 12230-12256 (Jul. 24, 2017).
Rothmund, "10 KV SiC-Based Medium-Voltage Solid-State Transformer Concepts for 400V DC Distribution Systems," PhD dissertation, *ETH Zurich* (2018).
European Patent Office, Extended European Search Report in European Patent Application No. 22171678.0, 9 pp. (Nov. 11, 2022).

* cited by examiner

DC DISTRIBUTION SYSTEM AND METHOD FOR DISTRIBUTING POWER

CROSS-REFERENCE TO RELATED APPLICATIONS

This patent application claims priority to European Patent Application No. 22171678.0, filed on May 4, 2022, which is incorporated herein in its entirety by reference.

FIELD OF THE DISCLOSURE

The present disclosure generally relates to a DC distribution system, and more particularly to use of a DC bus ring structure in a DC distribution system, which may be utilized in an electric vehicle charging system.

BACKGROUND OF THE INVENTION

DC distribution systems have gained significant interest in the recent years due to emerging DC applications such as EV charging and data centers, among others. Such distribution systems use one common DC bus that is typically fed by a single source converter and backed up with a single energy storage system. However, in case of a malfunction of either the source converter or the energy storage system, a reliable operation of the DC distribution system is not possible anymore.

The following abbreviations are used in this disclosure:

AC . . . Alternate Current
DC . . . Direct Current
BESS . . . Battery Energy Storage System
EV . . . Electric Vehicle
LV . . . Low-Voltage (typically 200 V-1 kV)
MV . . . Medium-Voltage (typically 1 kV-30 kV)

BRIEF SUMMARY OF THE INVENTION

The present disclosure is generally directed to a system and method for providing an improved DC distribution system. The described embodiments pertain to a direct current (DC) distribution system, the use of DC bus ring structure, and first and second methods for distributing power in a DC distribution system. Synergetic effects may arise from different combinations of the embodiments although they might not be described in detail.

All embodiments of the present invention concerning a method, might be carried out with the order of the steps as described, nevertheless this has not to be the only and essential order of the steps of the method. The herein presented methods can be carried out with another order of the disclosed steps without departing from the respective method embodiment, unless explicitly mentioned to the contrary hereinafter.

Technical terms are used by their common sense. If a specific meaning is conveyed to certain terms, definitions of terms will be given in the following in the context of which the terms are used.

According to a first aspect, a DC distribution system is provided that comprises a plurality of power consumer clusters each comprising at least one power consumer. The power consumer clusters are arranged as a ring structure with a common LV-DC ring bus. Each power consumer is connected to the LV-DC ring bus. The DC distribution system further comprises a plurality of normal-open ring switches. Each power consumer cluster is separated from its adjacent power consumer clusters by one of the normal-open ring switches. Each power consumer cluster is fed by a MV-DC/DC converter, which in turn is fed by an AC/DC converter connected to a MV-AC grid.

BRIEF DESCRIPTION OF THE SEVERAL VIEWS OF THE DRAWING(S)

DETAILED DESCRIPTION OF THE INVENTION

Identical or equivalent elements are in principle provided with the same reference signs.

Figure 1:
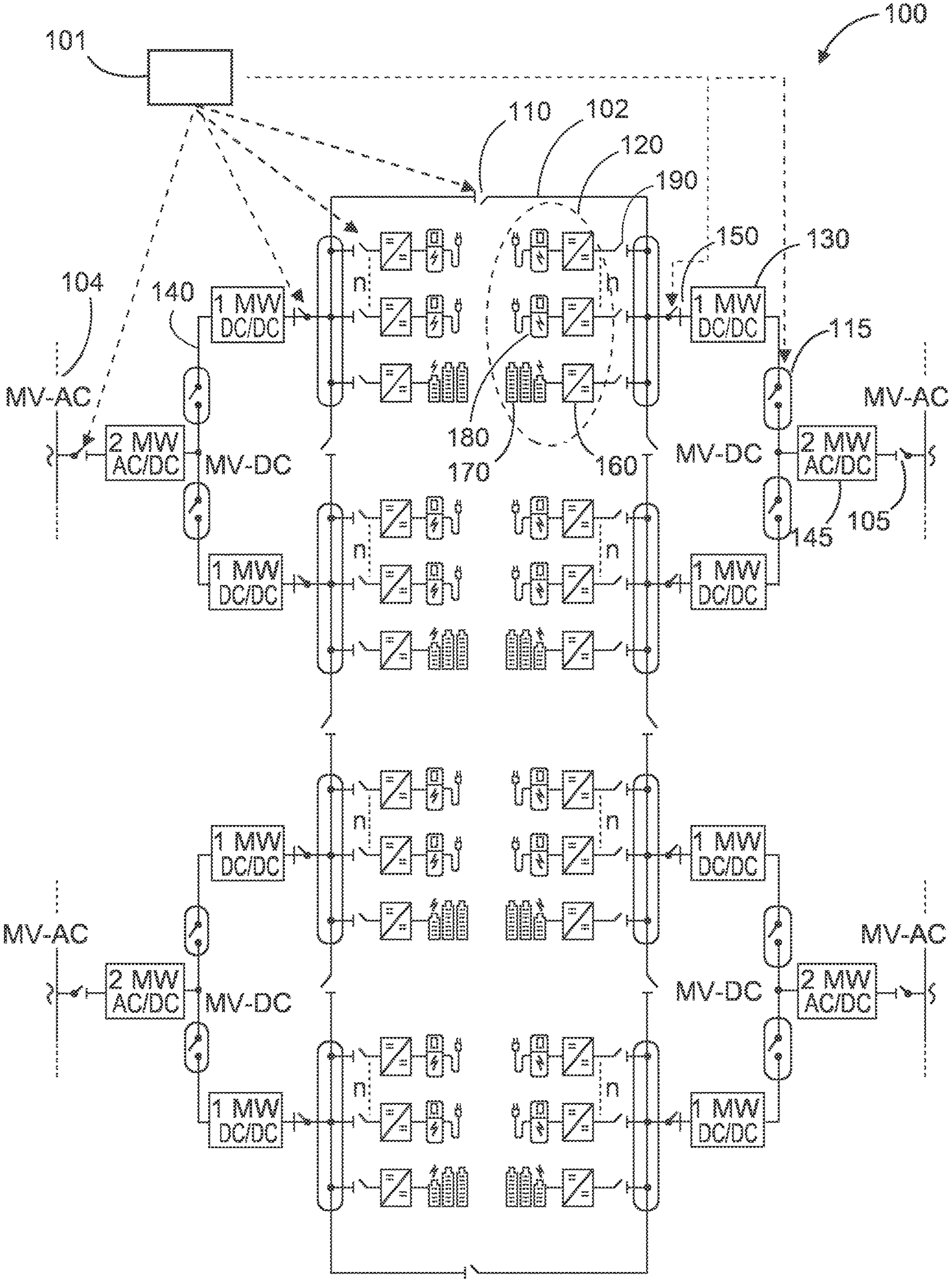
FIG. 1 is a block diagram of a power distribution system in accordance with the disclosure.

FIG. 1 shows a DC distribution system 100 according to an embodiment. The DC distribution system 100 comprises a plurality of power consumer clusters 120 each comprising a plurality of n power consumers 180. The power consumer clusters 120 further each comprise an energy storage 170 and LV-DC/DC converters 160 for supplying the consumers 180 and the energy storage 170 with power at appropriate voltages and currents. The DC/DC converters 160 for the energy storage are bi-directional such that they can receive power from the common LV-DC ring bus 102 but also provide power over the common LV-DC ring bus 102 to the consumers 180. The DC/DC converters for the consumers can be bidirectional as well in order to allow vehicle-to-grid support. Therefore, also the MV-DC/DC converter 130 and the MV AC/DC converter 145 can be bidirectional. "MW" stands for Megawatt in the figures.

The LV-DC/DC converters 180 for the power consumers 180 and energy storages 170 are each connected via a switch 190 to the DC bus 102. The switches 190 are also referred to as "energy storage or consumer switches" in this disclosure to enable a distinction to other switches in the power distribution system 100. Of course, an energy storage switch 190 refers to a switch that connects a LV-DC/DC converter 160 of an energy storage 170 to the DC bus 102. Correspondingly, a consumer switch 190 refers to a switch that connects a DC/DC converter 160 of a power consumer 180 to the DC bus 102. A power consumer 180, or consumer 180 for short, is, for example, a vehicle charging post or a cluster of servers in a data center but may further be any other power consumer consuming power at similar magnitudes. An energy storage 170 may be based, for example on a battery that is suitable to deliver power to these power consumers 180. However, also other power delivering devices or systems such as photovoltaic systems or fuel cells may be used additionally or instead. All such devices or systems are understood under the term "energy storage" in this disclosure. The energy storages 170 are useful, for example, for reducing the grid peak consumption and the MV-AC to LV-DC converter power rating.

Each of the power consumers 180 and each of the energy storages 170 are coupled via the energy storage or consumer switches 190 to the LV-DC bus 102, which is arranged as ring bus 102 and therefore referred to in the present disclosure as LV-DC ring bus 102 or as "ring bus" 102 for short. The ring bus 102 is divided into sections separated by switches 110 that are normally open, and therefore herein referred to as normal-open ring switches 110. The devices of one power consumer cluster 120, i.e., power consumers 180 and energy storage 170, are connected to one section of the ring bus 102. Due to the ring structure, every power consumer cluster 120 has two neighboring power consumer clusters.

Each cluster 120 is supplied by a MV-DC/DC converter 130, which again is supplied by an AC/DC converter 145 that is connected to the MV-AC grid. That is, each MV-DC/DC converter 130 is coupled via an MV-DC/DC converter switch to one section of the ring bus 120. The AC/DC converter 145 is coupled over a common MV-DC bus 140 to one, two or more MV-DC/DC converters 130, such that the AC/DC converter 145 supplies one, two or more power consumer clusters. In the common MV-DC bus 140, there are MV-DC bus switches 115 between the AC/DC converters 145 and the MV-DC/DC converters 130. The AC/DC converter 145 may be coupled over a switch 105, herein referred to as AC/DC switch 105 to the MV-AC grid 104.

Although the switches 105, 110, 150, 190 may be realized as manual switches or connectors, the switches are preferably self-operated or controllable switches. The switches may be realized as relays or as transistors or any other electronically switchable devices. The DC distribution system 100 may therefore comprises a controller 101. The controller 101 may also be responsible for controlling the MV-DC/DC converters 130, which may be operated bedirectional. The dashed lines in FIG. 1 indicate control lines. The DC distribution system 100 may further comprise failure detection circuits that detect an outage or malfunction of a power supplying device such as the MV-DC/DC converters or the energy storages. Converters or energy storages having outages, defects, malfunctions or which are under maintenance are referred to as malfunctioning or faulty devices for short in this disclosure. In the case of faulty energy storages or faulty power consumers, it is understood that either the power consumer 180 may be faulty or the DC/DC converter 160 connected to the power consumer 180 or energy storage 170. For the definition of "power consumer" it is referred to the explanation above describing the first aspect.

The LV-DC ring 102 is a complete ring. That is, if all normal-open ring switches 110 would be closed, all section of the ring would be galvanically connected to each other. By providing a complete ring, any power consumer cluster 120 and any substructure fed by an AC/DC converter has two neighbors such that in case of faults or malfunctions, the according neighboring power consumer clusters 120 or AC/DC substructures can supply the power consumer clusters 120 or substructures, where a fault or malfunction in a power supplying device occurred.

In FIG. 1, the reference signs for the converters, switches, power consumers and clusters are drawn only once representative for all corresponding devices in the DC distribution system. In the following FIGS. 2 and 3, individual devices are identified by specific reference signs.

Figure 2:
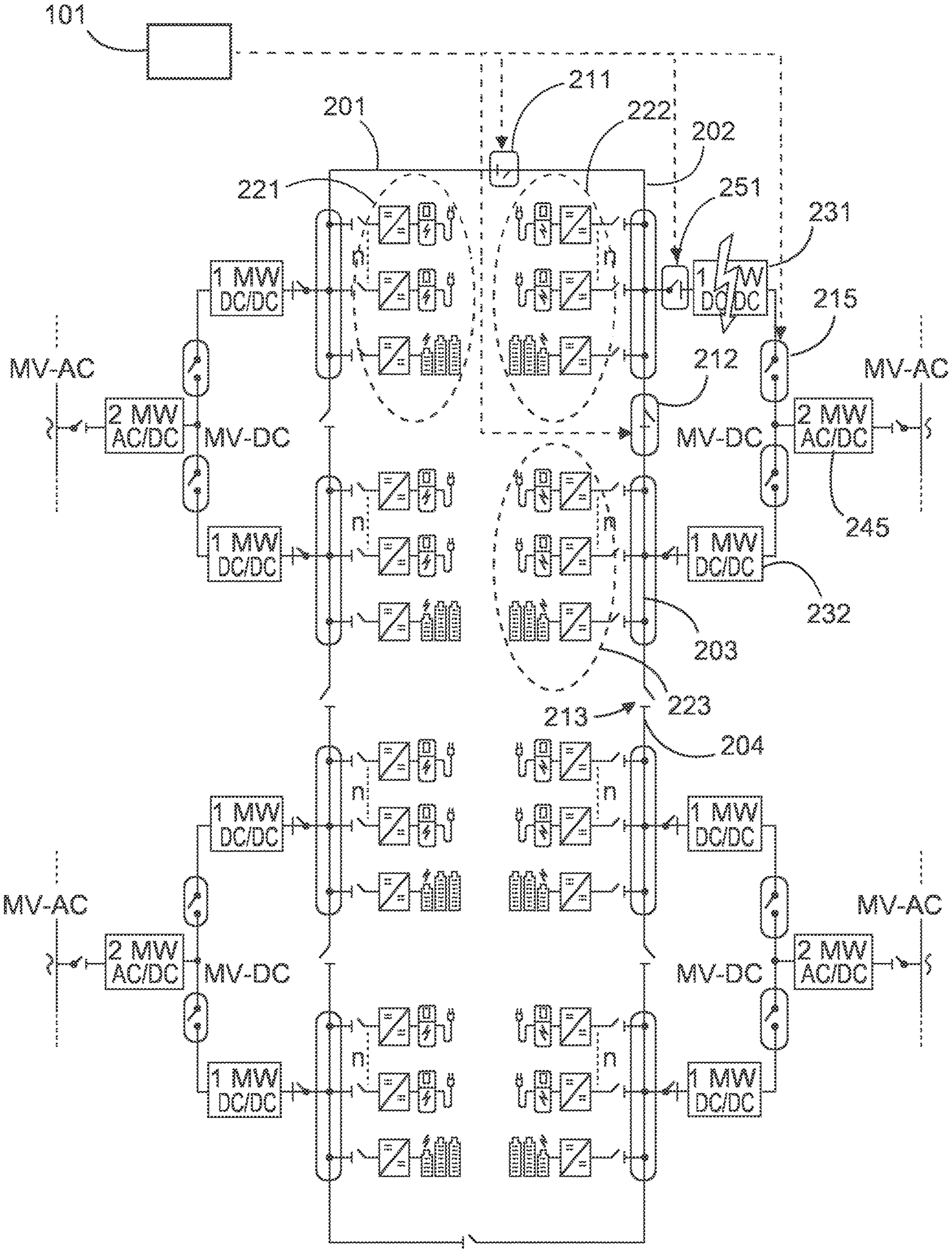
FIG. 2 is a block diagram of a power distribution system with a first fault scenario in accordance with the disclosure.
Figure 3:
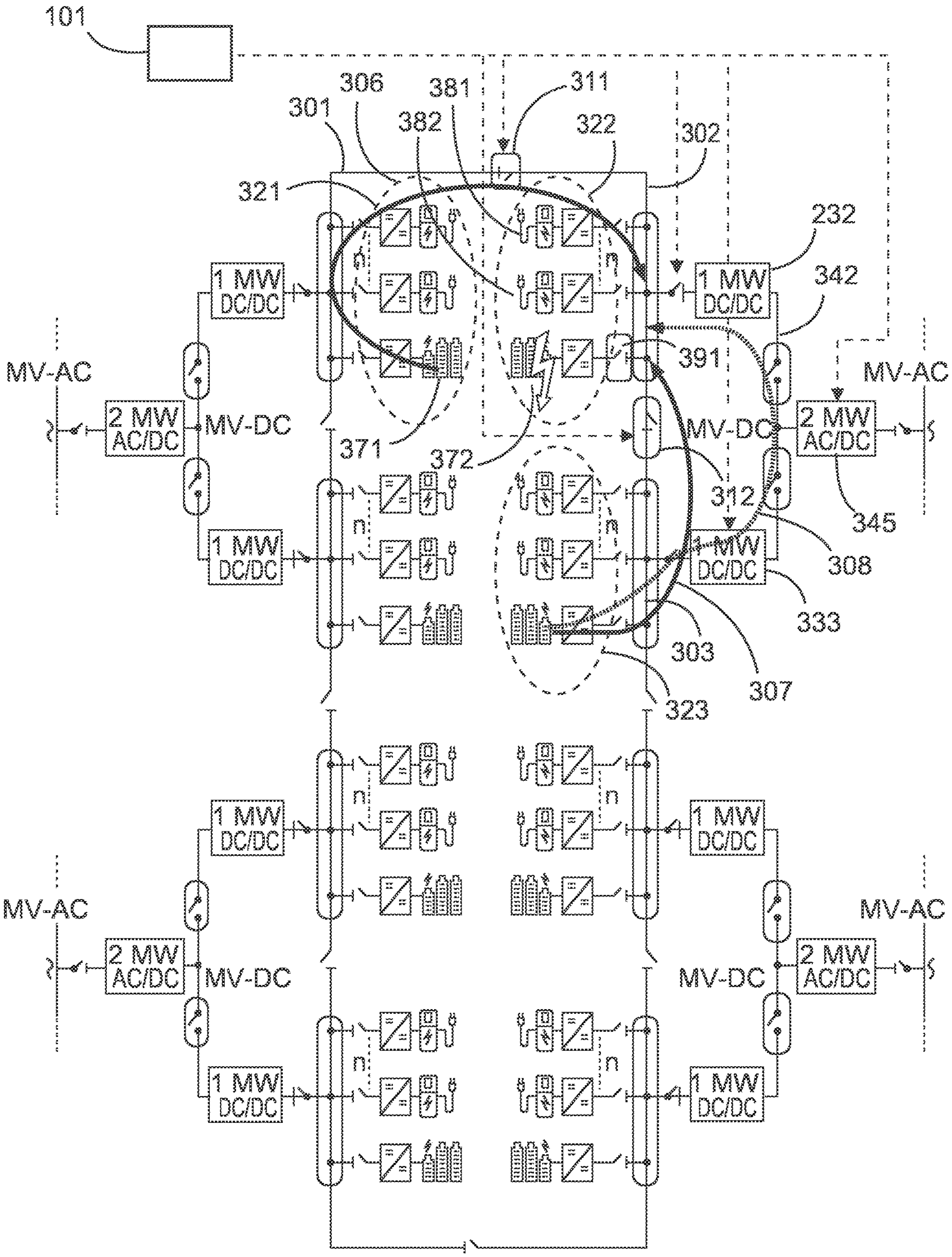
FIG. 3 is a block diagram of a power distribution system with a second fault scenario in accordance with the disclosure.

FIGS. 2 and 3 show examples of malfunctioning devices in the DC distribution systems and how to offset the negative effect partially or completely on the power consumer clusters or power consumers, respectively.

FIG. 2 shows an example where one MV-DC/DC converter 231 of the MV-DC/DC converters 130 is faulty or malfunctioning. The MV-DC/DC converter 231 supplies the power consumer cluster 222. If this converter 231 is malfunctioning, switch 251 is opened to disconnect the converter 231 from the section 202 of the common LV-DC ring bus 102. Since the power consumer cluster 222 is not provided with power from the MV-DC/DC converter 231 anymore and the energy storage may not be sufficient to replace the outage, switches 211 and 212 are closed such that power is provided from the neighboring ring bus sections 201 and 203. In case that the sections 201 and 203 are already utilized to capacity, the total available power could be shared such each of the power consumer clusters 221, 222, and 223 has a share of ⅔ of the total available power at his disposal.

The switches 211, 212 may be mechanical or electromechanical switches or connectors that are switched manually, however, preferably they are controlled by controller 101. The DC distribution system 100 may comprise one or more fault detection circuits (not shown in the figures) that communicate with the controller 101, so that a fully automatic switching is achieved. The DC distribution systems may further comprise means to distribute power between the sections. For example, a section may be prioritized such that only a distinct amount of power is shared with other sections or that power is only shared if a pre-determined capacity utilization is not exceeded. For example, section 201 may only be connected to section 202 if the capacity utilization of power of section 201 is below 50%.

In embodiments, only one neighbor may be connected to the section 202 or cluster 222, respectively. In other embodiments, more neighboring sections than the direct neighbor sections 201, 203 may be connected. The decision for adding more neighbors may be based on priorities or on the actual required power in the single sections.

The principle presented above can also be applied in case of a malfunction of one of the AC/DC converters 245, where ring bus switches 211, 212, and 213 are closed so that power can be provided by sections 201 and 204.

The MV-DC bus switch 218 arranged between the AC/DC converter 245 and the MV-DC/DC converter 231 allow further operation of the AC/DC converter 245 and the other DC/DC converter 232, which works properly, in case MV-DC/DC 231 converter fails (e.g., to short or due to maintenance).

FIG. 3 shows an example, where one energy storage 372 is faulty. The faulty energy storage is part of the power consumer cluster 322 of ring bus section 302, to which consumers 381 and 382 are connectable and which is supplied by MV-DC/DC converter 332, which is again supplied by AC/DC converter 345. Energy storage or consumer switch 391 is open to disconnect the faulty energy storage 372 from the LV-DC ring bus section 302. In order to offset the effect of the outage, there are two principal options.

The first option is similar to the one discussed in FIG. 2. That is, the ring bus switches 311 and 312 are closed such that the neighboring bus ring sections 301 and 303 are galvanically connected to the ring bus section 302 with the faulty energy storage 372 indicated by the paths 306 and 307 in FIG. 3. In this case, energy storages 371 and 373 of the neighboring clusters 321 and 323 are switched to section 302 to replace at least in parts the faulty energy storage 372.

As a second option, path 308 over the MV-DC/DC converter 333, the common MV-DC bus 342 and the MV-DC/DC converter 332 may be chosen for including the energy storage 373 into the power consumer cluster 322. For this, the MV-DC/DC converter 333 may be designed bidirectional. Similarly, the MV-DC/DC converter 332 may be designed bi-directional for supporting a power flow from energy storage 372 to the cluster 323 in case of a malfunction of energy storage 373. In the second option, sections 323 and 322 would still be separate, so that the interactions between the two sections 302, 303 or clusters 322, 323 can be kept low.

In embodiments, a combination of paths 306 and 307, a combination of paths 306 and 308, or one of the paths 306, 307, 308 may be chosen. With respect to the switching, similarly to the case presented in FIG. 2, a controller 101 may be in charge of actuating the switches 311, 312 and/or controlling the MV-DC/DC converter 333. Alternatively, the switches can be operated manually by an operator on site or, for example, via a communication device that includes an appropriate application, or any method known to a skilled person.

Figure 4:
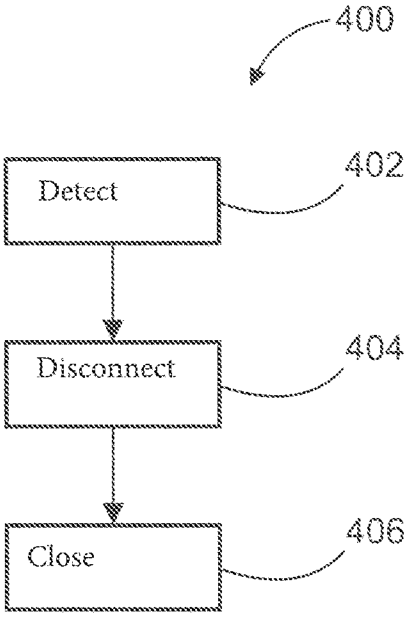
FIG. 4 is a flowchart for a first method for distributing power in a DC distribution system in accordance with the disclosure.

FIG. 4 shows a method 400 for distributing power in a DC distribution system 100 with a LV-DC ring bus 102 separated by normal-open LV-DC ring bus switches 110, such as a system shown in FIG. 1 in combination with the fault case shown in FIG. 2 and/or FIG. 3. The method 400 comprises the following steps: detecting 402 a malfunctioning power providing device 372, 231 connected to a section 202, 302 of the LV-DC ring bus 102; disconnecting 404 the power providing device 372, 231 from the section 202, 302 of the LV-DC ring bus 102; and closing 406 a normal-open LV-DC ring bus switch 211, 311 connecting the section 202, 302 of the LV-DC ring bus to a neighboring section 201, 301 of the LV-DC ring bus 102. The power providing device is, for example, a MV-DC/DC converter 231 or an energy storage 372 but may also be a photovoltaic device or fuel cell. The last step of the method may further comprise closing a further normal-open LV-DC ring bus switch 212, 312 connecting the section 202, 302 of the LV-DC ring bus 102 to a further neighboring section 203, 303 of the LV-DC ring bus.

Figure 5:
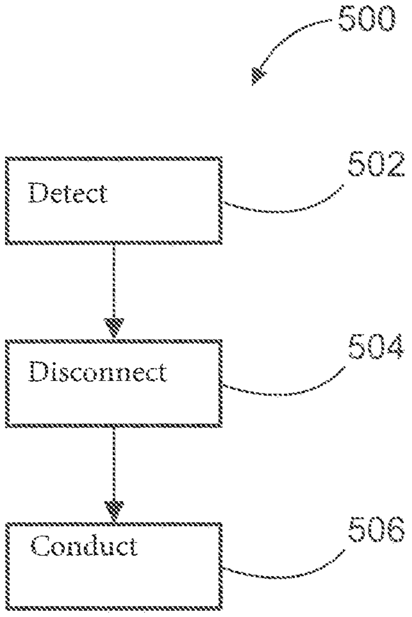
FIG. 5 is a flowchart for a second method for distributing power in a DC distribution system in accordance with the disclosure.

FIG. 5 shows a method 500 for distributing power in a DC distribution system 100 with a LV-DC ring bus 102 separated by normal-open LV-DC ring bus switches 110, such as a system shown in FIG. 1 in combination with the fault case shown FIG. 3. The method 500 comprises the steps: detecting 502 a malfunctioning energy storage 372 connected to a section 302 of the LV-DC ring bus 102; disconnecting 504 the energy storage 372 from the section 302 of the LV-DC ring bus 102; and conducting 506 power of a neighboring energy storage 373 over a MV-DC/DC converter 333, a common DC bus 342, and a MV-DC/DC converter 332, wherein the common DC bus 342 is connected to an MV-AC/DC converter feeding MV-DC/DC converter 333 and the MV-DC/DC converter 332.

LIST OF REFERENCE SIGNS

100 DC power distribution system
101 controller
102 common LV-DC ring bus
104 MV-AC grid
105 AC/DC switch
110 normal-open ring switches
115 MV-DC bus switches
120 power consumer clusters
130 MV-DC/DC converter
140 common MV-DC bus
145 AC/DC converter
150 MV-DC/DC converter switch
160 LV-DC/DC converters
170 energy storage
180 vehicle charger or a vehicle charging station
190 energy storage or consumer switch
201 first neighboring section of the LV-DC ring bus
202 section of the LV-DC ring bus disconnected from faulty MV-DC/DC converter
203 second neighboring section of the LV-DC ring bus
204 further section of the LV-DC ring bus
211 normal-open ring switch to the first neighboring cluster
212 normal-open ring switch to the second neighboring cluster
213 further normal-open ring switch
215 MV-DC bus switch
221 first neighboring power consumer cluster
222 power consumer cluster disconnected from faulty MV-DC/DC converter
223 second neighboring power consumer cluster
231 faulty MV-DC/DC converter
232 "other" MV-DC/DC converter
245 AC/DC converter
251 MV-DC/DC converter switch between faulty MV-DC/DC converter and LV-DC ring bus
301 first neighboring section of the LV-DC ring bus
302 section of the LV-DC ring bus disconnected from faulty energy storage
303 second neighboring section of the LV-DC ring bus
306 path for power distribution in a fault case
307 path for power distribution in a fault case
308 path for power distribution in a fault case
311 normal-open ring switch to the first neighboring cluster
312 normal-open ring switch to the second neighboring cluster
321 first neighboring power consumer cluster
322 power consumer cluster disconnected from faulty energy storage
323 second neighboring power consumer cluster
332 MV-DC/DC converter
333 MV-DC/DC converter
342 common MV-DC bus
345 MV-AC/DC converter
371 neighboring energy storage
372 faulty energy storage
373 neighboring energy storage
381 power consumer in cluster 322
382 power consumer in cluster 322
391 energy storage or consumer switch for disconnecting faulty energy storage from LV-DC ring bus In the context of the present disclosure, a normal-open switch is a switch that, without taking any measure, is open or off. That is, it normally does not conduct current as long as it is actively closed, e.g., by applying a control voltage. The term power consumer refers to, for example, a vehicle-charging device such as an EV charging station or charging post, also known as Electric Vehicle Supply Equipment EVSE, although the vehicle charger does not consume the power itself but supplies power to a vehicle. Therefore, the DC distribution system may be a system for an EV charging facility. The power consumer can further be, for example a cluster of servers in a data center. Therefore, the DC distribution system may also be a system for a data center. However, the DC distribution system may also be used in other applications.

The MV-DC/DC converter converts the medium voltage provided by the AC/DC converter into low voltage. Therefore, the voltage of the DC ring bus is a low voltage, which is typically in the range of 200 V-1 kV.

The normal-open ring switches separate the LV-DC ring bus into sections, wherein each power consumer cluster is associated to one of these sections. In other words, the formation of clusters is proposed. Clusters may be, for example, server clusters in case of data centers and charging pole clusters in case of EV charging. The clusters are fed from independent source converters and have their individual energy storage systems. Further, a ring structure with normally-off switches that can be closed is proposed to enable a continuation of the operation of a cluster even if its source converter and energy storage has malfunctioned, as described in the following embodiments.

According to an embodiment, each AC/DC converter feeds one or more MV-DC/DC converters over a common MV-DC bus.

The AC/DC converter is connected to the MV-AC grid and converts the MV-AC into MV-DC, which is output to the common MV-DC bus. The voltage at the MV-DC bus is the input for, for example, two DC/DC converters, each of which outputs the converted voltage to one section of the LV-DC ring bus.

According to an embodiment, the DC distribution system comprises a plurality of energy storages, wherein each power consumer cluster comprises at least one energy storage of the plurality of energy storages, and wherein each energy storage is connected to the LV-DC ring bus.

An energy storage may be a battery storage, which is also commonly known as Battery Energy Storage System (BESS) or may be photovoltaic and/or fuel cells. The energy storage may be used, for example, to reduce of the grid peak consumption and the MV-AC to LV-DC converter power rating. Different types may be contained in the same system. Furthermore, each cluster may accommodate one or several energy storages.

According to an embodiment, the DC distribution system comprises a plurality of energy storage or consumer switches; wherein each power consumer and each energy storage are connected to the LV-DC ring bus via an energy storage or consumer switches.

Using an energy storage switch for the energy storage and a consumer switch for a consumer, a faulty energy storage or power consumer can be disconnected. Further, for example, a power consumer not in use or under maintenance can be disconnected. The switches are arranged between the LV-DC ring bus and DC/DC converters associated with the power consumers or the energy storage.

According to an embodiment, the DC distribution system comprises a plurality of LV-DC/DC converters, each arranged between an energy storage or consumer switch and the battery or consumer.

These LV-DC/DC converters are the converters mentioned in the explanation of the previous embodiment.

According to an embodiment, the power consumer is a vehicle charging post or a cluster of servers in a data center. However, the types of power consumers in the power consumer clusters are not limited to the mentioned.

According to an embodiment, the DC distribution system further comprises AC/DC converter switches and MV-DC/DC converter switches. Each AC/DC converter is connected via one of the AC/DC converter switches to an MV-AC grid, and each MV-DC/DC converter is connected to the LV-DC ring bus via one of the MV-DC/DC converter switches. The AC/DC converter switches and/or the MV-DC/DC converter switches are self-operated or controlled.

These switches may be used to disconnect a faulty converter from the subsequent stage or from the LV-DC bus. "Self-operated" means that they switch themselves if the switches are, for example, reacting to local overcurrent. "Controlled" means, that a controller may control the switches.

According to an embodiment, the DC distribution system further comprises a controller configured to switch any of the MV-DC/DC converter switches, the energy storage or consumer switches and/or the normal-open ring switches.

According to an embodiment, the controller is configured, in case of a malfunction of a MV-DC/DC converter associated with a power consumer cluster, to open the MV-DC/DC converter switch over which the MV-DC/DC converter is connected to the LV-DC ring bus, and to close a normal-open ring switch that connects the power consumer cluster to a neighboring power consumer cluster.

In other words, the controller disconnects the faulty MV-DC/DC converter from its LV-DC bus ring section by opening the corresponding switch and connects the neighboring LV-DC bus ring section and thus the two adjacent clusters by closing the normal-open ring switch. The controller may connect one neighboring LV-DC bus ring section or both neighboring LV-DC bus ring sections. This applies also for the following embodiments.

According to an embodiment, the controller is configured, in case of a malfunction of an AC/DC converter to open the AC/DC converter switch and/or the MV-DC/DC converter switches of MV-DC/DC converters fed by the AC/DC converter and over which the MV-DC/DC converters are connected to the LV-DC ring bus, and to close the normal-open ring switches that connect the power consumer clusters associated with the MV-DC/DC converters to the neighboring power consumer clusters.

In other words, the controller disconnects the faulty AC/DC converter and the subsequent DC/DC converter stages from their LV-DC bus ring sections by opening the corresponding switches and connects the LV-DC bus ring section adjacent to these faulty sections by closing the normal-open ring switch between these sections and the adjacent section. Also, the normal-open ring switch between the faulty sections may be closed.

According to an embodiment, the controller is configured, in case of a malfunction of an energy storage of an associated power consumer cluster to open the energy storage switch of the malfunctioning energy storage and to close the LV-DC ring switches to the power consumer clusters neighboring the associated power consumer cluster so that the associated power consumer cluster is supported by the energy storages of the neighboring power consumer clusters.

In other words, the controller disconnects the faulty energy storage from its LV-DC bus ring section by opening the corresponding switch and connects the LV-DC bus ring section adjacent to these faulty section by closing the normal-open ring switch between the faulty section and the adjacent section.

According to an embodiment, the controller is configured, in case of a malfunction of an energy storage of an associated power consumer cluster to open the energy storage switch of the malfunctioning energy storage and to switch the MV-DC/DC converters having the same common MV-DC bus such that a neighboring energy storage connected to these MV-DC/DC converters provides power over these MV-DC/DC converters and the common MV-DC bus to the associated power consumer cluster that comprises the malfunctioning energy storage. The MV-DC/DC converters may be bi-directional converters.

In other words, the controller disconnects the faulty energy storage. Instead of closing the normal-open ring switch between the faulty ring bus section and the neighboring section, the path via the MV-DC/DC converter pair is used, that are linked together by a common MV-DC bus, and which are supplied by the same AC/DC converter.

Further switches may be arranged between the AC/DC converter and the MV-DC/DC converters, i.e., one MV-side switch for each MV DC/DC converter. In case one of the MV-DC/DC converters fails (e.g., to short), this would allow further operation of the AC/DC converter and the other DC/DC converter, which works properly. Furthermore, this would allow maintenance of one MV-DC/DC converter without shutting down the AC/DC and the other DC/DC converter.

According to a further aspect, a use of a DC bus ring structure with power consumer clusters is provided. The power consumer clusters comprise a power consumer and an energy storage in a DC distribution system. The power consumer clusters are separated by switches and each power consumer cluster is fed by an associated MV-DC/DC converter.

An AC/DC converter may feed two or more MV-DC/DC converters over a common MV-DC bus.

According to a further aspect, a method for distributing power in a DC distribution system is provided, wherein the method comprises the following steps. In a first step, a malfunctioning power providing device connected to a section of the LV-DC ring bus is detected. In a second step, the power providing device is disconnected from the section of the LV-DC ring bus. In a third step, a normal-open LV-DC ring bus switch connecting the section of the LV-DC ring bus to a neighboring section of the LV-DC ring bus is closed.

The steps of the method may be performed by the controller of the DC distribution system. A disconnection of switches in case of a malfunction of a converter or an energy storage may be, for example, alternatively performed by a switch itself.

According to an aspect, a further method for distributing power in a DC distribution system is provided, wherein the further method comprises the following steps. In a first step, a malfunctioning energy storage connected to a section of the LV-DC ring bus is detected. In a second step, the energy storage is disconnected from the section of the LV-DC ring bus. In a third step, power of a neighboring energy storage is conducted a MV-DC/DC converter, a common DC bus, and a MV-DC/DC converter, wherein the common DC bus is connected to an MV-AC/DC connector feeding MV-DC/DC converter and the MV-DC/DC converter.

The steps of the further method may be performed by the controller of the DC distribution system.

The controller may comprise circuits without programmable logics or may be or comprise a micro controller, a field programmable gate array (FPGA), an ASIC, a Complex Programmable Logic Devices (CPLD), or any other programmable logic devices known to person skilled in the art.

The controller may perform the steps of the method according to a computer program element that may be part of a computer program, but which can also be an entire program by itself. For example, the computer program element may be used to update an already existing computer program to get to the present invention. The computer program and/or computer program element may be stored on a computer readable medium. The computer readable medium may be seen as a storage medium, such as for example, a USB stick, a CD, a DVD, a data storage device, a hard disk, or any other medium on which a program element as described above can be stored.

These and other features, aspects and advantages of the present invention will become better understood with reference to the accompanying figure and the following description.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A direct current (DC) distribution system, comprising:

a plurality of power consumer clusters, each comprising at least one power consumer, wherein the power consumer clusters are arranged as a ring structure with a common low voltage (LV) DC ring bus, and wherein each power consumer is connected to the LV-DC ring bus;

a plurality of normal-open ring switches, wherein each power consumer cluster is separated from its adjacent power consumer clusters by one of the plurality of normal-open ring switches;

wherein each power consumer cluster is fed by a respective medium voltage (MV) DC/DC converter that is fed by a respective MV AC/DC converter connected to a MV-AC grid.

2. The DC distribution system according to claim 1, wherein each MV-AC/DC converter feeds one or more MV-DC/DC converters over a common MV-DC bus (140).

3. The DC distribution system according to claim 1, wherein the DC distribution system comprises a plurality of energy storages, wherein each power consumer cluster comprises at least one energy storage of the plurality of energy storages, and wherein each energy storage is connected to the LV-DC ring bus.

4. The DC distribution system according to claim 3, further comprising a plurality of energy storage or consumer switches, wherein each power consumer and each energy storage is connected to the LV-DC ring bus via an energy storage or consumer switch.

5. The DC distribution system according to claim 3, wherein the DC distribution system further comprises a plurality of LV-DC/DC converters, each arranged between an energy storage or consumer switch and an energy storage or power consumer.

6. The DC distribution system according to claim 1, wherein the power consumer is a vehicle charging post or a cluster of servers in a data center.

7. The DC distribution system according to claim 1, wherein the DC distribution system further comprises self-operated or controlled AC/DC converter switches and self-operated or controlled MV-DC/DC converter switches; and wherein each AC/DC converter is connected via one of the AC/DC converter switches to an MV-AC grid; and wherein each MV-DC/DC converter is connected to the LV-DC ring bus via one of the MV-DC/DC converter switches.

8. The DC distribution system according to claim 1, wherein the DC distribution system further comprises a controller configured to switch any of the MV-DC/DC converter switches, the energy storage or consumer switches and/or the normal-open ring switches.

9. The DC distribution system according to claim 8, wherein the controller is configured, when a MV-DC/DC converter associated with a power consumer cluster malfunctions, to open the MV-DC/DC converter switch over which the MV-DC/DC converter is connected to the LV-DC ring bus, and to close a normal-open ring switch that connects the power consumer cluster to a neighboring power consumer cluster.

10. The DC distribution system according to claim 9, wherein the controller is further configured, when an AC/DC converter malfunctions, to open the AC/DC converter switch and/or the MV-DC/DC converter switches of MV-DC/DC converters fed by the AC/DC converter and over which the MV-DC/DC converters are connected to the LV-DC ring bus, and to close normal-open ring switches that connect the power consumer clusters associated with the MV-DC/DC converters to neighboring power consumer clusters.

11. The DC distribution system according to claim 10, wherein the controller is further configured, when an energy storage of an associated power consumer cluster malfunctions, to open the energy storage switch of the malfunctioning energy storage and to close a LV-DC ring switch to the power consumer cluster neighboring the associated power consumer cluster so that the associated power consumer cluster is supported by the energy storage of the neighboring power consumer cluster.

12. The DC distribution system according to claim 11, wherein the controller is configured, when an energy storage of an associated power consumer cluster malfunctions, to open the energy storage switch of the malfunctioning energy storage and to switch the MV-DC/DC converters having the same common MV-DC bus such that a neighboring energy storage connected to these MV-DC/DC converters provides power over these MV-DC/DC converters and the common MV-DC bus to the associated power consumer cluster that comprises the malfunctioning energy storage.

13. A method for distributing power in a direct current (DC) distribution system, comprising:

detecting a malfunctioning power providing device connected to a section of a low voltage (LV) DC ring bus;

disconnecting the power providing device from the section of the LV-DC ring bus; and closing a normal-open LV-DC ring bus switch connecting the section of the LV-DC ring bus to a neighboring section of the LV-DC ring bus.

14. The method according to claim 13, wherein a power consumer cluster is associated to the section of the LV-DC ring bus; and wherein the power consumer cluster is one of a plurality of power consumer clusters, each comprising at least one power consumer, wherein the power consumer clusters are arranged as a ring structure with the LV-DC ring bus as a common LV-DC ring bus, and wherein each power consumer is connected to the LV-DC ring bus.

15. The method according to claim 13, wherein a power consumer cluster is associated to the section of the LV-DC ring bus; and wherein the power consumer cluster is one of a plurality of power consumer clusters, each comprising at least one power consumer, wherein the power consumer clusters are arranged as a ring structure with the LV-DC ring bus as a common LV-DC ring bus, and wherein each power consumer is connected to the LV-DC ring bus;

wherein the power providing device is a medium voltage (MV) DC/DC converter, and wherein each power consumer cluster is fed by a respective MV DC/DC converter that is fed by a respective MV AC/DC converter connected to a MV-AC grid.

16. A method for distributing power in a direct current (DC) distribution system, comprising:

detecting a malfunctioning energy storage connected to a section of a low voltage (LV) ring bus;

disconnecting the energy storage from the section of the LV-DC ring bus; and conducting power of a neighboring energy storage over a medium voltage (MV) DC/DC converter, a common MV-DC bus, and a MV-DC/DC converter;

wherein the common MV-DC bus is connected to an MV-AC/DC connector feeding MV-DC/DC converter and the MV-DC/DC converter.

* * * * *